United States Patent [19]
Morgan et al.

[11] Patent Number: 4,890,409
[45] Date of Patent: Jan. 2, 1990

[54] ELECTRICAL COD JIGGER

[76] Inventors: Lloyd A. Morgan, P.O. Box 272, La Scie NF, Canada, A0K 3M0; George Spector, 233 Broadway Rm 3815, New York, N.Y. 10007

[21] Appl. No.: 291,579

[22] Filed: Dec. 29, 1988

[51] Int. Cl.⁴ .......................................... A01K 89/017
[52] U.S. Cl. ................................... 43/15; 43/16; 43/19.2; 43/21; 43/26.1
[58] Field of Search ............... 43/15, 16, 4, 4.5, 19.2, 43/21, 17, 26.1, 27.4; 114/268, 293, 244, 243, 210, 297, 298, 299

[56] References Cited

U.S. PATENT DOCUMENTS

| | | | |
|---|---|---|---|
| 2,707,843 | 5/1954 | Howe | 43/26.1 |
| 2,709,867 | 4/1950 | Routh | 43/26.1 |
| 3,466,784 | 9/1969 | Bonner | 43/19.2 |
| 4,344,587 | 8/1982 | Hildreth | 43/26.1 |
| 4,349,977 | 9/1982 | Brodribb et al. | 43/26.1 |
| 4,376,350 | 3/1983 | Bednarz et al. | 43/27.4 |
| 4,378,652 | 4/1983 | Lindgren | 43/26.1 |
| 4,420,900 | 12/1983 | Nestor | 43/19.2 |
| 4,449,317 | 5/1984 | Brodribb et al. | 43/26.1 |
| 4,807,386 | 2/1989 | Emory, Jr. | 43/27.4 |

Primary Examiner—Nicholas P. Godici
Assistant Examiner—Michael William Starkweather

[57] ABSTRACT

An apparatus for operating a jig from a fishing boat is provided in which the jig is raised to and lowered from the fishing boat by a cable on a motor operated reel. A tub on the jig by a fish will reverse the motor and activated an indicator light to show that the fish is caught.

1 Claim, 1 Drawing Sheet

ELECTRICAL COD JIGGER

BACKGROUND OF THE INVENTION

The instant invention relates generally to fishing equipment and more specifically it relates to an apparatus for operating a jig from a fishing boat.

Numerous fishing equipment have been provided in prior art that are adapted to catch various types of fish when used by fishermen. For example, U.S. Pat. Nos. 3,635,441; 3,991,502 and 4,169,330 all are illustrative of such prior art. While these units may be suitable for the particular purpose to which they address, they would not be as suitable for the purposes of the present invention as heretofore described.

SUMMARY OF THE INVENTION

A primary object of the present invention is to provide an apparatus for operating a jig from a fishing boat that will overcome the shortcomings of the prior art devices.

Another object is to provide an apparatus for operating a jig from a fishing boat in which the jig is raised to and lowered from the fishing boat by a cable on a motor operated reel.

An additional object is to provide an apparatus for operating a jig from a fishing boat in which a tug on the jig by a fish will reverse the motor and activate an indicator light to show that the fish is caught.

A further object is to provide an apparatus for operating a jig from a fishing boat that is simple and easy to use.

A still further object is to provide an apparatus for operating a jig from a fishing boat that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

DETAILED DESCRIPTION OF THE PREFERRED EMBODIMENTS

Figure 1:
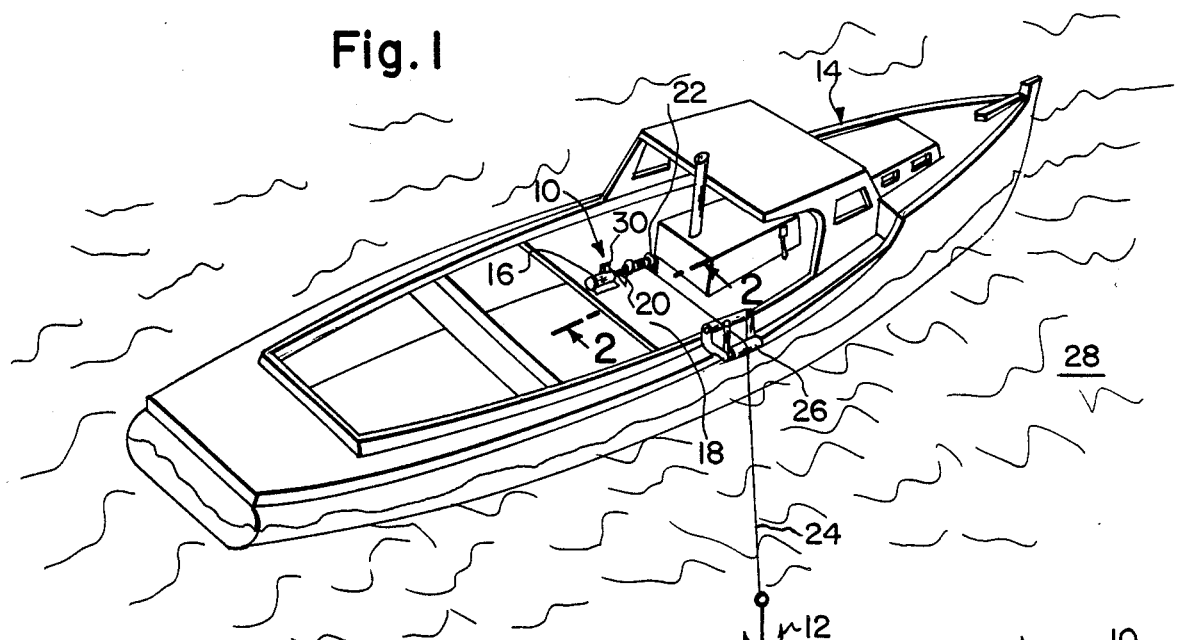
FIG. 1 is a perspective view of a fishing boat embodying the invention.
Figure 2:
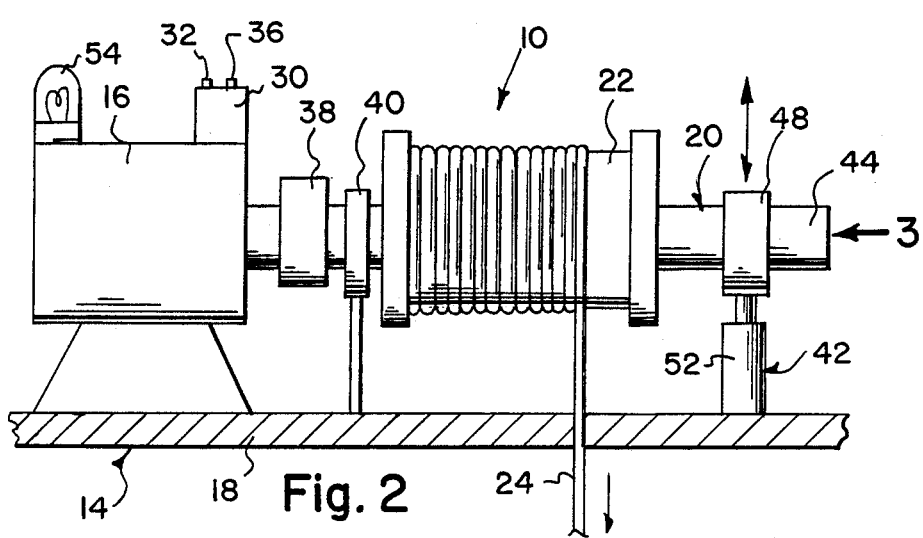
FIG. 2 is a cross sectional view taken along line 2—2 in FIG. 1 showing the apparatus in greater detail.
Figure 3:
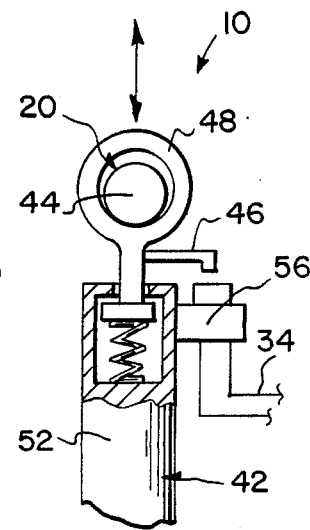
FIG. 3 is an end view with parts in section of the telescopric bearing support as indicated by arrow 3 in FIG. 2.
Figure 4:
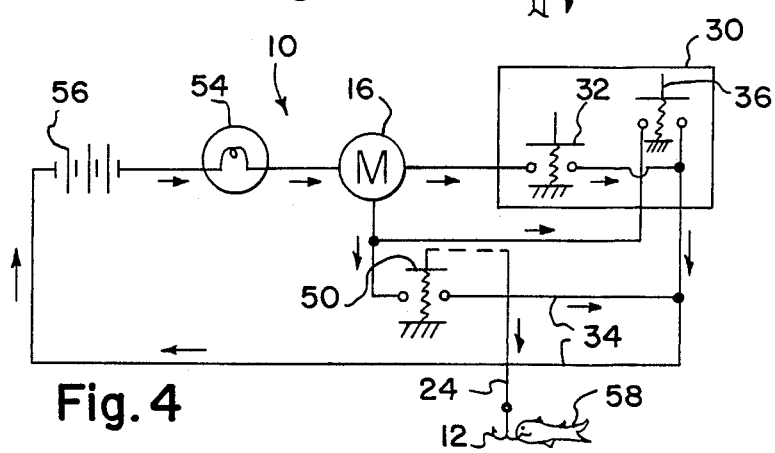
FIG. 4 is a circuit thereof showing how a tug on the jib by a fish will reverse the motor to haul up the fish and also activate an indicator light to show that the fish is caught.

Turning now descriptively to the drawings, in which similar reference characters denote similar elements throughout the several views, FIGS. 1 through 4 illustrate an apparatus 10 for operating a jig 12 from a fishing boat 14. An electric motor 16 is mounted to deck 18 of the fishing boat 14. The motor 16 has a shaft 20 extending therefrom with a reel 22 rotatably affixed to the shaft 20 of the motor 16. An elongated cable 24 is wound at one end onto the reel 22 and extends therefrom past a guide 26 into water 28 about the fishing boat 14, with other end of the cable 24 attached to the jig 12.

A control box 30 is provided which includes a forward switch 32 electrically connected in a circuit 34 to the motor 16 to forwardly operate the motor 16 turning the reel 22 on the shaft 20 to unwind the cable 24 therefrom. A reverse switch 36 is electrically connected in the circuit 34 to the motor 16 to reversely operate the motor 16 turning the reel 22 on the shaft 20 to wind the cable 24 thereon.

A clutch 38 is on the shaft 20 for disengaging the motor 16 from the reel 22. A fixed bearing 40 is on the shaft 20 between the clutch 38 and the reel 22 for rotatably supporting the reel 22 above the deck 18 of the fishing boat 14.

A spring biased telescopic bearing support 42 is at distal end 44 of the shaft 20. The bearing support 42 has an actuating arm 46 on moveable portion 48 thereof. A reverse button switch 50 is affixed to a stationary portion 52 of the telescopric bearing support 42 and is electrically connected in the circuit 34 to the motor 16. An indicator 54, being a light or alarm, is electrically connected in the circuit 34 to the motor 16. A battery 56 is electrically connected in the circuit 34 to supply electrical current to the indicator 54 and the motor 16, so that a tug on the jig 12 by a fish 58 will cause the actuating arm 46 to depress the reverse button switch 50 to reverse the motor 16 and activate the indicator 54 to show that the fish 58 is caught.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. An apparatus for operating a jig from a fishing boat which comprises:

(a) an electric motor mounted to deck of the fishing boat, said motor having a sufficiently flexible shaft extending therefrom;

(b) a reel rotatably affixed to said shaft of said motor;

(c) an elongated cable wound at an upper end onto said boat with a lower end of said cable attached to the jig;

(d) a control box which includes a forward switch electrically connected in a circuit to said motor to forwardly operate said motor turning said reel on said shaft to unwind said cable therefrom and a reverse switch electrically connected in the circuit to said motor to reversely operate said motor turning said reel on said shaft to wind said cable thereon;

(e) a clutch on said shaft for disengaging said motor from said reel; and (f) a fixed bearing on said shaft between said clutch and said reel for rotatably supporting said reel above the deck of the fishing boat;

(g) a spring biased telescopic bearing support at distal end of said shaft, said bearing support having an actuating arm on moveable portion thereof;

(h) a reverse button switch affixed to a stationary portion of said telescopic bearing support and electrically connected in the circuit to said motor;

(i) an indicator electrically connected in the circuit to said motor; and (j) a battery electrically connected in the circuit to supply electricity current to said indicator and said motor so that a tug on the jig by a fish will cause said flexible shaft to bend sufficiently in order to cause said actuating arm to depress the reverse button switch to reverse said motor and activate said indicator to show that the fish is caught.

* * * * *